United States Patent Office 3,355,358
Patented Nov. 28, 1967

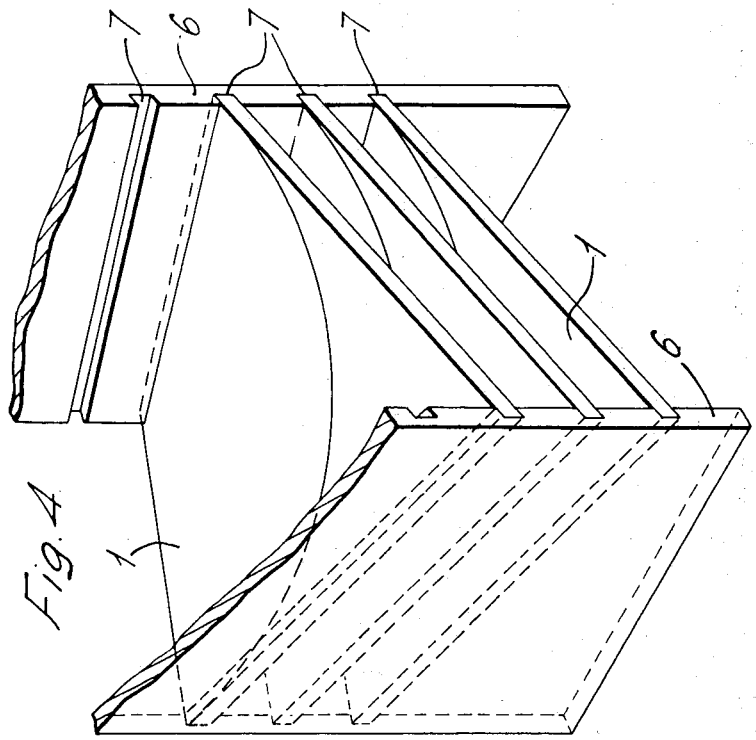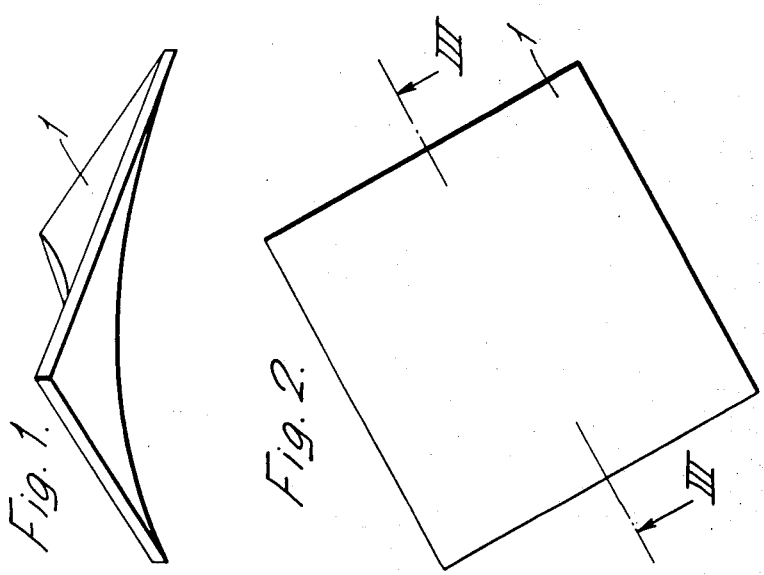

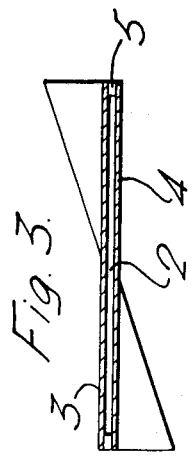
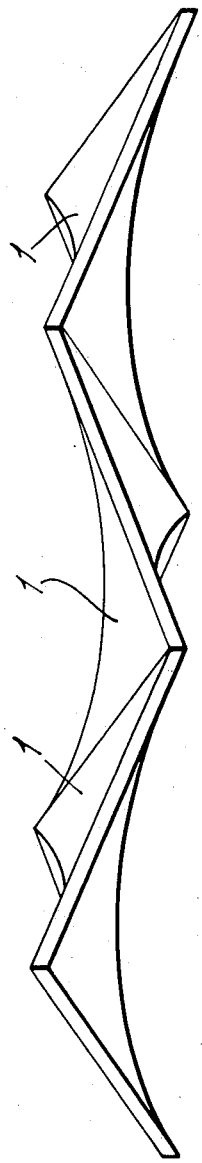
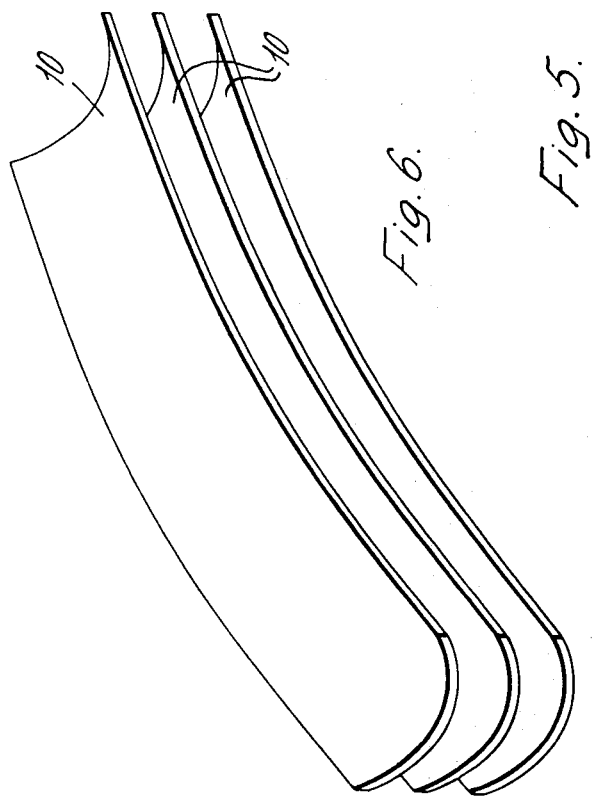

3,355,358
NUCLEAR FUEL ELEMENT HAVING SHEATH OF ANTICLASTIC FORM
John Leslie Craston, Wallingford, and Stanley Frederick Pugh, Abingdon, England, assignors to United Kingdom Atomic Energy Authority, London, England
Filed Apr. 11, 1966, Ser. No. 541,591
Claims priority, application Great Britain, Apr. 13, 1965, 15,625/65
7 Claims. (Cl. 176—67)

This invention relates to containers and in particular to containers subject to internal pressure.

One example of such a container is provided by the sheath of a nuclear fuel element which can become internally pressurised by the accumulation of gases formed by the fission processes during reactor operations. Plate type fuel elements are particularly prone to distortion and swelling during irradiation. Plate type fuel elements are conventionally arranged as an assembly of parallel plates having narrow coolant passages between the plates and such distortion or swelling can cause restriction of the coolant flow with resultant overheating and damage. One method of overcoming the difficulties would be the use of a thicker sheath but the incerase in sheathing material required would pose neutron absorption problems and therefore reduce the efficiency of the fuel element.

According to the present invention a container is provided with walls formed an anticlastic surfaces i.e. a surface having opposite curvatures at any given point on the surface.

Preferably the container has two opposed parallel walls formed as anticlastic surfaces.

According to a feature of the invention a container or sheath for a nuclear fuel plate comprises a pair of spaced parallel sheets each sheet being formed to provide an anticlastic surface. Preferably each said sheet comprises an hyperbolic paraboloid.

According to further features of the invention a nuclear fuel element comprises a fuel core enclosed within a container, said container having walls formed as anticlastic surfaces. Said wall surfaces may comprise hyperbolic paraboloids, helicoids or hyperboloids of revolution.

To enable the nature of the invention to more readily understood an embodiment of the invention will now be described, by way of example only, with reference to the accompanying drawing. In the drawing:

FIG. 1 is an elevation of a fuel element plate.
FIG. 2 is a plan of the fuel element plate of FIG. 1.
FIG. 3 is a sectional elevation on the line III—III of FIG. 2.
FIG. 4 is a pictorial view of a fuel plate locating assembly.
FIG. 5 is an elevation of an alterative form of fuel plate assembly.
FIG. 6 is a pictorial view of yet a further fuel plate assembly.

Referring to FIGS. 1, and 2 and 3 of the drawings the fuel element plate 1 comprises a central core 2 of nuclear fuel sandwiched between two sheets 3 and 4 of a protective sheathing material, for example stainless steel. The core is located within a stainless steel frame 5 and the edges of the sheets 3 and 4 welded to frame 5 to completely enclose the fuel core.

The fuel element plate is formed to provide a hyperbolic paraboloid. Preferably the fuel core is plate like and the sheathing sheets, the core and the frame are individually formed as anticlastic surfaces and subsequently brought together to form the fuel element plate. The resultant sheath or fuel container is particularly resistant to internal pressure.

In one arrangement the fuel plate is approximately 3 inches square in plan and curved such that opposite corners are level and the variation in level between adjacent corners is 0.3 inch. Using sheathing materials 0.015 inch in thickness it can be shown that the deflection of an anticlastic side wall of the sheath due to uniform internal pressure is $1/148$ that of a flat sheet of the same thickness and area, or the same as that of a flat sheet whose thickness is 0.08 inch.

It will be appreciated that the fuel element plate may be cast or the fuel element may be assembled by conventional roll bonding techniques using a flat fuel core plate with flat sheets of sheathing material and the assembly subsequently formed into a suitable anticlastic shape for example as a hyperbolic paraboloid, a helicoid or a hyperboloid of revolution. Such an assembly may be shaped by pressing or explosive forming techniques and is particularly suitable for cermet fuels.

By using the invention the sheath wall thickness may be reduced by up to 75% as compared with sheaths using flat walls or alternatively a saving of 50% in thickness can be achieved with a permissible increase in internal pressure of about 400%.

One method of locating fuel element plates is shown in FIG. 4 in which a plurality of anticlastically curved fuel element plates 1 are located between two parallel side members 6.

The members 6 are provided with grooves 7 inclined such that the fuel plates 1 are held in a spaced parallel relationship.

Fuel elements formed as described have the added advantage of increased resistance to deformations caused by external forces, for example, variations in coolant pressures, and deflections due to the flow of coolant through the channels.

The fuel element plates are of course not restricted to square shapes and the invention may be applied to rectangular or other arrangements. FIG. 5 shows a fuel element formed by welding a plurality of the fuel plates 1 in an elongated edge to edge arrangement. The plates 1 may be edge joined in various numerical arrangement for example to provide a helicoidal fuel element or to form a larger element square or rectangular in plan to suit various circumstances.

FIG. 6 shows an alternative form of fuel element assembly in which plates 10, shaped as hyperboloids of revolution are arranged in a spaced relationship. It will be appreciated that the plates 10 may be held apart by spacers (not shown) in a manner well known in the fuel element art.

While the specific embodiments are described in relation to nuclear fuel containers it will be apparent that the invention is not limited to such use nor to the dimensions given.

We claim:
1. A nuclear fuel element assembly wherein a plurality of anticlastically curved fuel plates are held in a spaced parallel realtionship within a casing said casing comprising side members arranged to locate the plates and define in conjunction with the fuel plates a plurality of coolant passageways.

2. A nuclear fuel element comprising a core of nuclear fuel enclosed within a gas-tight sheath, said sheath comprising at least one pair of spaced parallel walls of anticlastic form.

3. A nuclear fuel plate comprising a core of nuclear fuel enclosed within a gas-tight sheath, said sheath comprising a pair of spaced, parallel sheets, each sheet being formed to provide an anticlastic surface.

4. A sheathed nuclear fuel plate according to claim 3 wherein a fuel core is located within a frame, the core and frame are sandwiched between the said sheets and the edges of the sheets are sealed to the frame.

5. A sheathed nuclear fuel plate according to claim 4 wherein the fuel plate is rectangular in plan and symmetrically curved such that opposite corners are equi-distant from a median plane.

6. A fuel element assembly for a nuclear reactor comprising a plurality of anticlastically curved fuel plates secured in an edge to edge relationship, and wherein each fuel plate is rectangular in plan and provided with a core of nuclear fuel located within a frame, the core and frame being sandwiched between a pair of spaced parallel sheets of anticlastic form.

7. A fuel element assembly according to claim 6 wherein said fuel element is helicoidal in form and comprises a plurality of anticlastically curved fuel plates secured in an elongated edge to edge relationship.

References Cited

UNITED STATES PATENTS

| 2,975,927 | 3/1961 | Arne | 220—1 |
| 2,980,667 | 4/1961 | Coombs | 176—90 X |
| 2,981,673 | 4/1961 | Johnnson | 176—75 |
| 2,987,458 | 6/1961 | Breden et al. | 176—90 X |
| 2,988,495 | 6/1961 | Battle | 176—90 X |
| 3,198,856 | 8/1965 | Hammond et al. | 176—75 |
| 3,238,107 | 3/1966 | Leyse et al. | 176—75 X |

L. DEWAYNE RUTLEDGE, *Primary Examiner.*

CARL D. QUARFORTH, *Examiner.*

M. J. SCOLNICK, *Assistant Examiner.*